(12) United States Patent
Watwe et al.

(10) Patent No.: US 6,504,721 B1
(45) Date of Patent: Jan. 7, 2003

(54) THERMAL COOLING APPARATUS

(75) Inventors: Abhay Watwe, Chandler, AZ (US); Ravi Prasher, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 78 days.

(21) Appl. No.: 09/676,099

(22) Filed: Sep. 29, 2000

(51) Int. Cl.[7] .................................................. H05K 7/20
(52) U.S. Cl. ..................... 361/700; 361/698; 361/699; 257/714; 257/715; 174/15.2; 165/80.4; 165/104.21
(58) Field of Search ............................... 361/683–709, 361/717–722; 165/80.4, 104.26, 104.33; 174/15.2, 16.3; 257/714, 715, 719

(56) References Cited

U.S. PATENT DOCUMENTS

| | | | | |
|---|---|---|---|---|
| 4,724,901 A | * | 2/1988 | Munekawa | 165/104.21 |
| 5,168,919 A | * | 12/1992 | Berenholz et al. | 165/80.4 |
| 5,409,055 A | * | 4/1995 | Tanaka et al. | 165/104.33 |
| 5,925,929 A | * | 7/1999 | Kuwahara et al. | 257/714 |
| 5,946,190 A | * | 8/1999 | Patel et al. | 361/700 |
| 5,959,837 A | * | 9/1999 | Yu | 361/697 |
| 6,125,035 A | * | 9/2000 | Hood, III et al. | 361/687 |
| 6,189,601 B1 | * | 2/2001 | Goodman et al. | 165/80.3 |
| 6,288,895 B1 | * | 9/2001 | Bhatia | 361/687 |
| 6,304,441 B1 | * | 10/2001 | Han | 361/687 |
| 6,328,097 B1 | * | 12/2001 | Bookhardt et al. | 165/104.33 |
| 6,359,780 B1 | * | 3/2002 | McMahan et al. | 361/687 |

FOREIGN PATENT DOCUMENTS

JP 355065891 A * 5/1980 ............ 165/104.21

* cited by examiner

*Primary Examiner*—Boris L. Chervinsky
(74) *Attorney, Agent, or Firm*—Blakely, Sokoloff, Taylor & Zafman LLP

(57) ABSTRACT

A method and apparatus for cooling a heat source in an electronic device is provided. The apparatus includes a vapor chamber with a heat source at a first end. A heat sink can be provided at a second end of the vapor chamber. The vapor chamber absorbs the heat generated by the heat source. The heat is then transferred via the vapor chamber to a plurality of fins attached to the vapor chamber. If a heat sink is provided, the heat is also transferred via the vapor chamber to the heat sink. The heat sink can also include a plurality of fins. The fins and the heat sink then convectively dissipate the heat to the atmosphere.

27 Claims, 3 Drawing Sheets

THERMAL COOLING APPARATUS

FIELD OF THE INVENTION

The present invention relates generally to the field of thermal dissipation devices and, more particularly, to a method and apparatus for improving the efficiency of a thermal cooling apparatus in an electronic device.

BACKGROUND OF THE INVENTION

Thermal dissipation devices are present in a wide variety of applications. Such devices generally employ conduction, convection, or a combination of conduction and convection to dissipate heat generated by a heat source. Conduction is the transfer of heat by the movement of heat energy from a high temperature region to a low temperature region in a body. Convection is the transfer of heat from the surface of a body by the circulation or movement of a liquid or gas over the surface.

These thermal dissipation devices are often used to cool mobile, server, and desktop applications. One example of such an application in which thermal dissipation devices are used is an electronic device such as a microprocessor. Heat can be dissipated from an electronic device through the outer surfaces of the device into the ambient atmosphere.

Currently, in many applications, an electronic device is coupled to a heat pipe that is coupled to a heat sink. Heat generated by the device is transferred through the heat pipe into the heat sink. The heat sink, which is typically a mass of material (usually metal), draws heat energy away from the heat source by conduction of the energy from a high-temperature region to a low-temperature region of the metal. The heat energy can then be dissipated from a surface of the heat sink to the atmosphere by convection.

A well-known technique of improving the efficiency of a conductive heat sink is to provide a greater surface area on the heat sink so that more heat can dissipate from the heat sink into the atmosphere by natural (or free) convection. Increased surface area is typically provided by fins that are formed on a base portion of the heat sink. The thermal efficiency of a heat sink can be further increased by employing forced convection wherein a flow or stream of air is forced over and around the surface of the heat sink.

As the number of components in electronic devices increases, or as the power requirements or operating speeds of the electronic devices increases, the amount of heat generated can increase to a point where conventional heat sink and air convection solutions are inadequate. For example, the airflow required to dissipate the greater level of heat can become excessive, or the physical size of the heat sink required to dissipate the heat can become prohibitive for the particular application.

In the case of portable electronic devices, a balance must be struck between the size of the entire thermal dissipation apparatus and the amount of heat that needs to be dissipated by the device. High power portable electronic devices may generate a great deal of heat, but the portable nature of the device requires the size of the thermal dissipation apparatus to be quite small. One way to achieve this balance is to replace the heat pipe with a vapor chamber to transfer the heat energy from the electronic device to a heat sink. This method is preferred for two reasons. First, the vapor chamber has better mechanical rigidity due to its flat and square shape. A heat pipe, on the other hand, generally has to be physically modified from a cylindrical shape to a rectangular shape. Second, a vapor chamber has better thermal performance.

Vapor chambers have generally been used in the cooling of server applications. In these applications, the vapor chamber and/or heat sink sits on top of the heat source or die. This is not feasible in portable electronic devices since the heat sink is preferably located away from the heat source because of overall package size constraints. For example, the overall stack up height of the thermal dissipation device is usually limited by the relatively small housings of portable devices such as notebook computers. Also, it is generally desirable to use the atmospheric air outside of the portable electronic device to draw the heat convectively away from the vapor chamber.

BRIEF DESCRIPTION OF THE DRAWINGS

The present invention is illustrated by way of example, and not limitation, in the figures of the accompanying drawings in which.

DETAILED DESCRIPTION

A method and apparatus for improving the efficiency of a thermal cooling apparatus is described. The thermal cooling apparatus includes a vapor chamber to cool a heat source within a portable electronic device. In one embodiment, the vapor chamber has a first end and a second end. A heat source at the first end of the vapor chamber generates heat that is transferred to the vapor chamber. A plurality of fins are attached to the vapor chamber. The fins dissipate heat from the vapor chamber.

Figure 1:
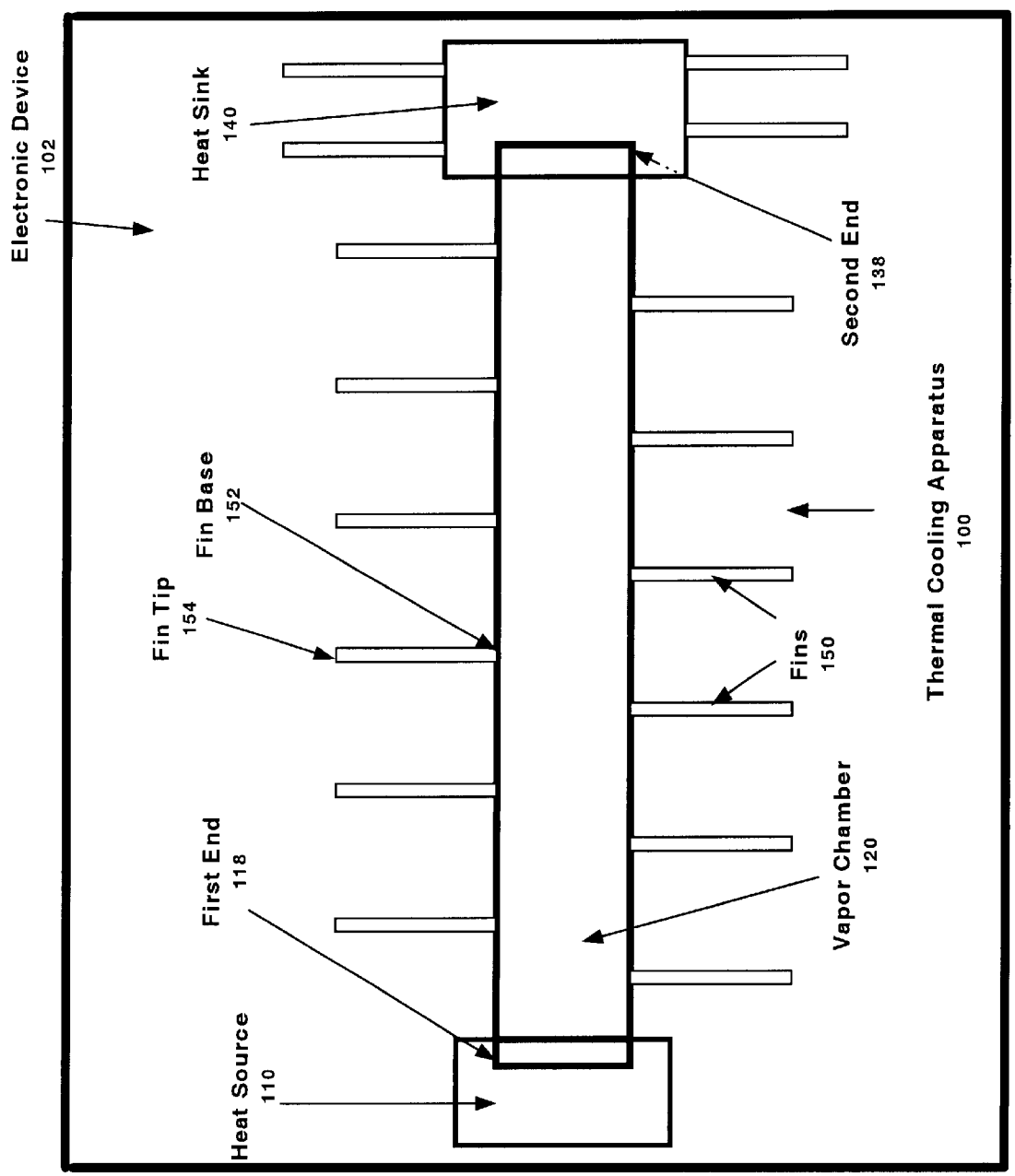
FIG. 1 is a side view of a thermal cooling apparatus in accordance with an embodiment of the invention.

In FIG. 1, a thermal cooling apparatus 100 is shown. It includes a vapor chamber 120 with a first end 118 and a second end 138. At the first end 118 is a heat source 110 that generates heat. This heat is then transferred from the heat source 110 to the vapor chamber 120 by conduction. The fluid in the vapor chamber 120 vaporizes after absorbing the heat, and the vapor carries the heat from one end of the vapor chamber 120 to the other. In one embodiment, at the second end 138 of the vapor chamber 120, a heat sink 140 can be provided. The heat sink 140 draws heat energy away from the heat source 110 via the vapor chamber 120 by conduction. The heat energy is then dissipated from a surface of the heat sink 140 to the atmosphere by convection.

The heat source 110 can be one of any number of devices that generate heat during operation. Examples of heat sources 110 in electronic devices such as computer equipment include integrated circuit dice, or microprocessors. The heat source 110 may be included in a portable electronic device, such as a notebook computer. In the embodiment shown in FIG. 1, the electronic device 102 houses the entire thermal cooling apparatus 100.

The heat source 110 and the heat sink 140 may be attached to the vapor chamber 120 using a variety of methods. For example, the heat sink 140 and the heat source 110 can be soldered, welded, or brazed to the vapor chamber 120. Alternatively, a thermally conductive adhesive can be used to attach the heat source 110 and heat sink 140 to the vapor chamber 120. The heat sink 140 and heat source 110 can, alternatively, be integrally formed with the vapor chamber 120 by casting directly in the walls of the vapor chamber 120.

An embodiment of the invention shown in FIG. 1 includes a plurality of fins 150 attached to the vapor chamber 120. Fins 150 may also be attached to the heat sink 140. These fins 150 improve the efficiency of the entire apparatus by providing a greater surface area for heat dissipation on the heat sink 140 and the vapor chamber 120. This allows more heat to dissipate from both the heat sink 140 and the vapor chamber 120 to the atmosphere.

There are several ways to attach the fins. The fins 150 can be welded to the housing of the vapor chamber 120 or a thermally conductive adhesive can be used to attach the fins 150. Fins 150 can also be formed integrally with the vapor chamber housing. Preferably, the fins 150 are attached to the vapor chamber 120, but alternatively can be attached to the heat sink 140, or both.

The walls of the vapor chamber 120 are preferably relatively thin such that the temperature inside the vapor chamber 120 is approximately equal to the temperature at the fin base 152 where the fins 150 are attached to the walls of the vapor chamber 120. Generally, the vapor chamber 120 is filled with liquid such as water and has a wick inside. A heat pipe may be used in this type of application instead of a vapor chamber 120. A heat pipe also has a wick. However, the vapor chamber 120 provides more flexibility in manufacturing in comparison to a heat pipe.

Figure 2:
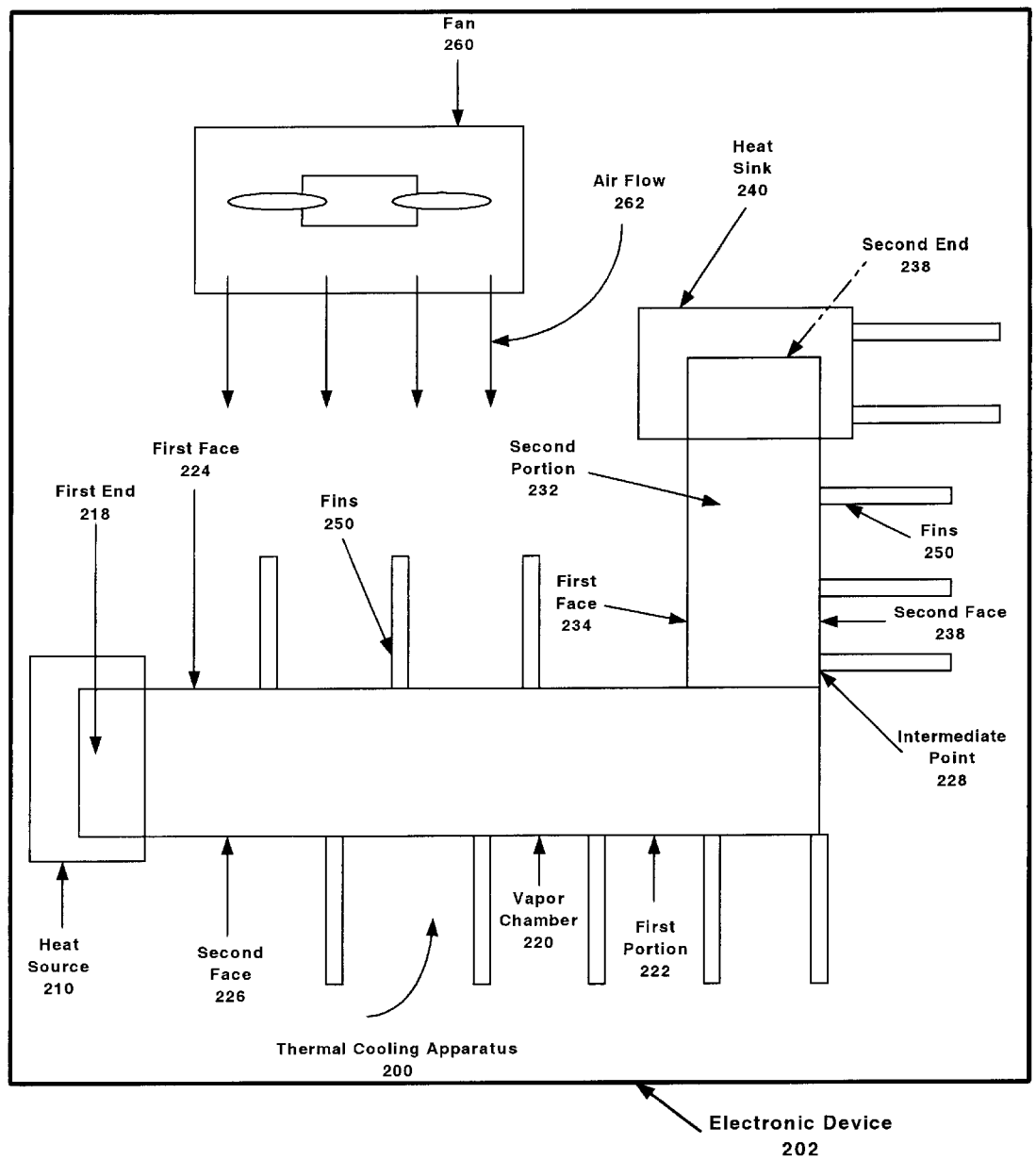
FIG. 2 is a side view of a thermal cooling apparatus in accordance with another embodiment of the invention.

FIG. 2 shows another embodiment of the invention. A thermal cooling apparatus 200 includes a vapor chamber 220 having a first portion 222 and a second portion 232. The first portion 222 extends from the first end 218 of the vapor chamber 220, where the heat source 210 is located, to the intermediate point 228. The second portion 232 extends from the intermediate point 228 to the second end 238. The second portion 232 extends in a different direction than the first portion 222. In the exemplary embodiment shown in FIG. 2, the second portion 232 is perpendicular to the first portion 222.

The embodiment shown in FIG. 2, in which the vapor chamber 220 has a first portion 222 and a second portion 232, minimizes the space taken up by the vapor chamber 220. In a portable electronic device, such as a notebook computer, the heat sink 240 is preferably located away from the heat source 210 because of overall package size constraints. For example, the overall stack up height of the thermal dissipation device is usually limited by the relatively small housings of portable devices such as notebook computers. By bending the vapor chamber 220 to create the first portion 222 and second portion 232, packaging space for the various components of the electronic device is maximized.

Also, it is generally desirable to use the atmospheric air outside of the electronic device 202 to draw the heat convectively away from the vapor chamber 220. By placing the second portion 232 perpendicular to the first portion 222, the majority of the thermal cooling apparatus 200 is inside the electronic device 202 while the heat sink 240, located on the second end 238 of the second portion 232 of the vapor chamber 220, can be located outside of the electronic device 202 or at a location inside the electronic device 202 that is convenient with respect to the various other components in the electronic device. This aids in the packaging of the electronic device 202.

In one embodiment, the first portion 222 has a first face 224 and a second face 226. As seen in FIG. 2, the fins 250 are attached to both the first face 224 and second face 226 of the first portion 222 of the vapor chamber 220. Alternatively, any number of fins 250 may be attached to either the first face 224, the second face 226, or both. The number, shape, and location of the fins 250 can be selected to provide adequate heat dissipation for a particular heat source 210.

The second portion 232 also has a first face 234 and a second face 236 opposing the first face 234. As seen in FIG. 2, the fins 250 are attached to the second face 236 in this embodiment. However, fins 250 may also be attached to the first face 234 of the second portion 224 of the vapor chamber 220. Indeed, any number of fins 250 may be arranged in a variety of ways on any part of the vapor chamber 220.

In one embodiment, a total of fifty fins 250 are attached to the first face 224 and second face 226 of the first portion 222 and the second face 236 of the second portion 232 of the vapor chamber 220. It has been observed that this configuration can result in approximately a 10-watt increase in the power handling capacity of the overall thermal cooling apparatus. This is very design specific, however. Different embodiments varying the number of fins, the spacing of the fins, the direction in which the fins are stacked, the size and shape of the fins, and the size and shape of the vapor chamber will provide different results.

FIG. 2 also shows an embodiment in which a fan 260 is provided to force the convection process to occur at a more rapid rate. The fan 260 may be positioned near the heat sink 240, near the vapor chamber 220, or near both. An air flow 262 created by the fan 260 will cause the heat from the fins 250, vapor chamber 220, and heat sink 240 to dissipate to the atmosphere. Convection driven by a fan 260 is particularly well-suited to a vapor chamber 220 with fins 250.

Other embodiments may vary the shape and size of the fins which can vary the level of thermal efficiency of the entire apparatus. For example, the fins may have a rectangular shape or a cylindrical shape. However, there are many other shapes and sizes available.

Other embodiments may vary the size and shape of the vapor chamber as well. In one embodiment, the vapor chamber may have a rectangular shape. In another embodiment, the vapor chamber may have a square shape. The shape and size of the vapor chamber can also vary the level of thermal efficiency of the entire apparatus.

In any of the embodiments, the heat sink, if provided, can be made of a variety of materials. A metal such as copper is typically used because of its high thermal conductivity. Other materials such as aluminum, steel, or metal filled plastic can be used. Various alloy metals such as aluminum, zinc, or other thermally conductive metals can also be used for the heat sink.

Similarly, the vapor chamber can also be made of a variety of materials. Generally copper is used. However, the material is not essential to the invention and any thermally conductive metal can be used for the vapor chamber.

Figure 3:
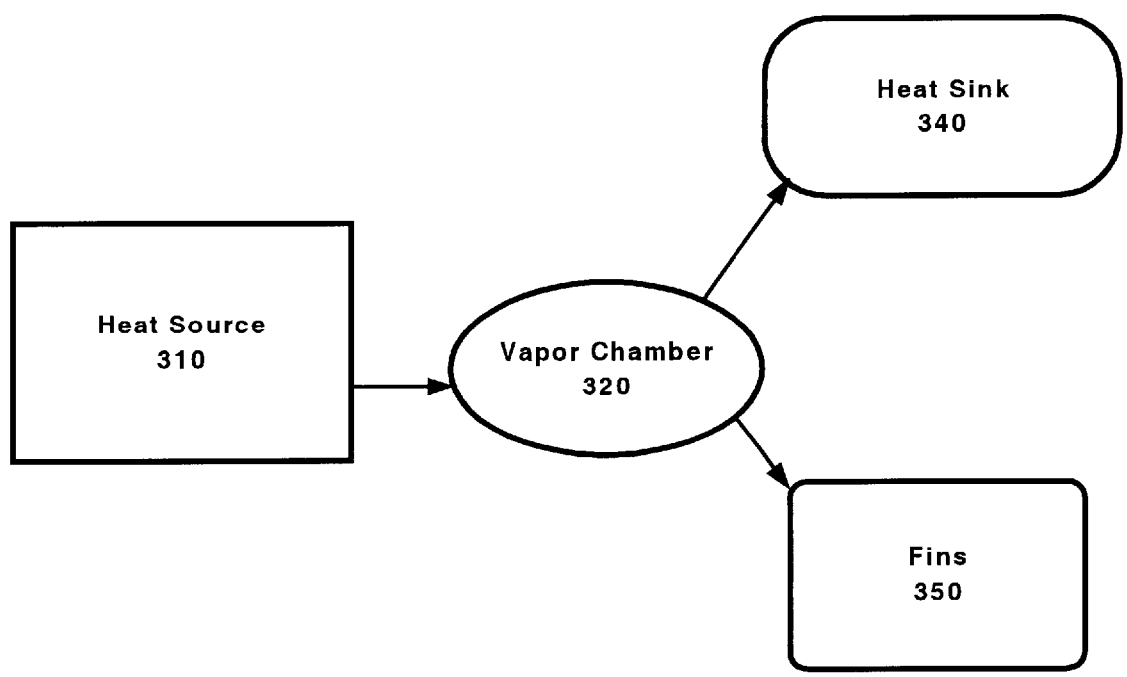
FIG. 3 is a flowchart of a method of removing heat from a heat source in accordance with an embodiment of the invention.

FIG. 3 shows a method of cooling a heat source 310 in an electronic device such as a notebook computer. The method includes transferring heat generated by a heat source 310 in an electronic device to a vapor chamber 320. The method further includes transferring the heat from the vapor chamber 320 to a heat sink 340 and to a plurality of fins 350, both of which can be attached to the vapor chamber 320. The heat is then dissipated from the fins 350 and heat sink 340 to the atmosphere. As previously described with reference to the various embodiments of the apparatus, the fins 350 may be attached to the vapor chamber 320, but alternatively can be attached to the heat sink 340, or both. In addition, there are many embodiments as to the shapes and sizes of the fins 350 and vapor chamber 320 for any number of embodiments of the thermal cooling apparatus.

A method and an apparatus for improving the efficiency of a thermal cooling apparatus have been described. Although the present invention has been described with reference to specific embodiments, the specification and drawings are to be regarded as illustrative rather than restrictive.

What is claimed is:

1. An apparatus comprising:
    a vapor chamber having a first end, a second end, and a first portion extending from said first end to an intermediate point on said vapor chamber and a second portion extending from said intermediate point to said second end of said vapor chamber, said first portion having a first face and a second face opposing said first face;
    a heat source at said first end of said vapor chamber, said heat source to generate heat to be transferred to said vapor chamber; and
    a plurality of fins attached to said first and second faces, said fins to dissipate heat from said vapor chamber.

2. The apparatus of claim 1 wherein said second portion has a first face and a second face opposing said first face, and said fins are attached to said second face.

3. The apparatus of claim 1 further comprising a heat sink at said second end of said vapor chamber, said heat sink to dissipate heat from said vapor chamber.

4. The apparatus of claim 1 wherein said heat source is in a portable electronic apparatus.

5. The apparatus of claim 4 wherein said portable electronic apparatus is a notebook computer.

6. The apparatus of claim 1 wherein said heat source is an integrated circuit die.

7. The apparatus of claim 1 wherein said heat source is a microprocessor.

8. The apparatus of claim 1 wherein said fins have a rectangular shape.

9. The apparatus of claim 1 wherein said fins have a cylindrical shape.

10. The apparatus of claim 1 further comprising a fan to force an air flow through said fins.

11. The apparatus of claim 1 wherein said vapor chamber is rectangular.

12. The apparatus of claim 1 wherein said vapor chamber contains a fluid.

13. An apparatus comprising:
    a vapor chamber having a first end, a second end, and a first portion extending from said first end to an intermediate point on said vapor chamber and a second portion extending from said intermediate point to said second end of said vapor chamber, said first portion having a first face and a second face opposing said first face;
    a portable electronic apparatus having a heat source, said heat source attached to said first end of said vapor chamber, said heat source to generate heat to be transferred to said vapor chamber; and
    a plurality of fins attached to said first and second faces, said fins to dissipate heat from said vapor chamber.

14. The apparatus of claim 13 wherein said second portion has a first face and a second face opposing said first face, and said fins are attached to said second face.

15. The apparatus of claim 13 further comprising a heat sink attached to said second end of said vapor chamber, said heat sink to dissipate heat from said vapor chamber.

16. The apparatus of claim 13 wherein said heat source is in a portable electronic apparatus.

17. The apparatus of claim 16 wherein said portable electronic apparatus is a notebook computer.

18. The apparatus of claim 13 wherein said heat source is an integrated circuit die.

19. The apparatus of claim 13 wherein said heat source is a microprocessor.

20. The apparatus of claim 13 wherein said fins have a rectangular shape.

21. The apparatus of claim 13 wherein said fins have a cylindrical shape.

22. The apparatus of claim 13 further comprising a fan to force an air flow through said fins.

23. The apparatus of claim 13 wherein said vapor chamber is rectangular.

24. The apparatus of claim 13 wherein said vapor chamber contains a fluid.

25. An apparatus comprising:
    means for storing vapor having a first end, a second end, and a first portion extending from said first end to an intermediate point on said means for storing vapor and a second portion extending from said intermediate point to said second end of said means for storing vapor, said first portion having a first face and a second face opposing said first face;
    means for generating heat at said first end of said means for storing vapor, said means for generating heat to generate heat to be transferred to said means for storing vapor; and
    means for dissipating heat attached to said first and second faces, said means for dissipating heat to dissipate heat from said means for storing vapor.

26. The apparatus of claim 25 wherein said means for storing vapor contains a fluid.

27. The apparatus of claim 25 wherein said second portion has a first face and a second face opposing said first face, and said means for dissipating heat is attached to said second face.

* * * * *